Nov. 30, 1954  KARL-HEINZ GÖSCHEL  2,695,600
FUEL INJECTION SPARK IGNITION, INTERNAL-COMBUSTION ENGINE
Filed June 30, 1952

INVENTOR
KARL-HEINZ GÖSCHEL
ATTORNEYS

United States Patent Office 2,695,600
Patented Nov. 30, 1954

2,695,600

FUEL INJECTION SPARK IGNITION INTERNAL-COMBUSTION ENGINE

Karl-Heinz Göschel, Stuttgart-Unterturkheim, Germany, assignor to Gutbrod Motorenbau G. m. b. H., Plochingen, Germany Application June 30, 1952, Serial No. 296,313

Claims priority, application Germany July 10, 1951

4 Claims. (Cl. 123—32)

The present invention relates to a fuel injection, spark ignition, internal combustion engine.

More particularly this invention relates to the aforedescribed type of internal combustion engine operating with a two-stroke cycle in accordance with the Otto principle. Specifically therefore the present invention relates to a fuel injection, spark ignition, two-stroke cycle, internal combustion of the port scavenged type.

It is an object of the present invention to provide a fuel injection, spark ignition, internal combustion engine operating with a two-stroke cycle in accordance with the Otto principle in which the fuel is atomized more effectively.

The present invention therefore has for a specific object to provide an internal combustion engine of the aforedescribed type including fuel injection means so disposed that the fuel path meets scavenging air streams introduced through two or more scavenging ports and merging with one another.

It is generally known in the prior art to arrange fuel injection nozzles so that injection takes place from the top of the cylinder in a direction toward the rising air stream and in which engines the spark plug is mounted in the whirling plane of the joined scavenging air stream. Under these considerations the fuel jets extend parallel to the piston path against the upwardly directed air stream.

It is also known to insert a fuel injection nozzle through the wall or cylinder so that the fuel jets that leave the injection nozzle cross the path of the piston in the cylinder when they flow into the cylinder space swept by the piston. In such arrangement the fuel jets enter from below and rise upwardly into the swept out cylinder space so that the scavenging air stream and the fuel jet have an upwardly directed component of motion.

These aforedescribed arrangements have for their purpose to assist the atomization of the fuel and to properly distribute it into the scavenging air. However such arrangements do not provide for proper fuel atomization.

Thus the present invention in accomplishing its primary object of effecting fuel atomization so directs the fuel jets that they meet the scavenging air streams where these latter streams merge. It is at this point that the whirl formation is especially high. If in addition to the whirl the scavenging air streams and the fuel jets have opposed components of motion, there is then an assurance that the fuel up to the time of ignition is intimately intermingled with the scavenging air and effectively atomized.

An additional point in connection with the present invention and in order that the fuel jets in their path toward the merging point of the scavenging air stream meet as little resistance as possible in traversing the swept out cylinder space consists in, when utilizing the known reversed scavenging means, arranging the fuel injection nozzle on the side of the cylinder wall having the exhaust port therein and above said port.

Further and more specific advantages of the present invention will be apparent from the accompanying drawing illustrating diagrammatically an embodiment of the invention and in which.

Figure 1:
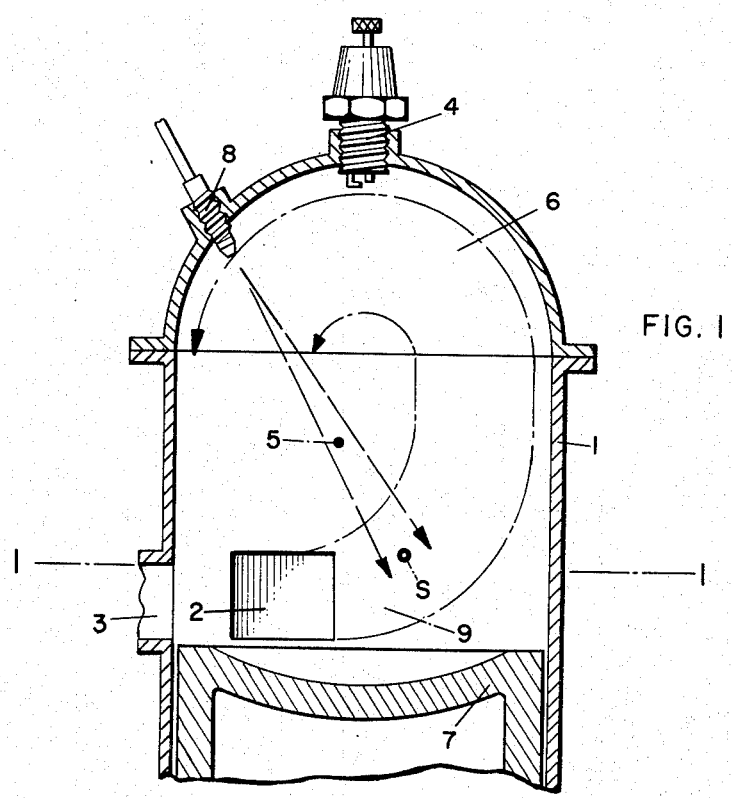
Figure 1 illustrates an axial sectional view of the cylinder.
Figure 2:
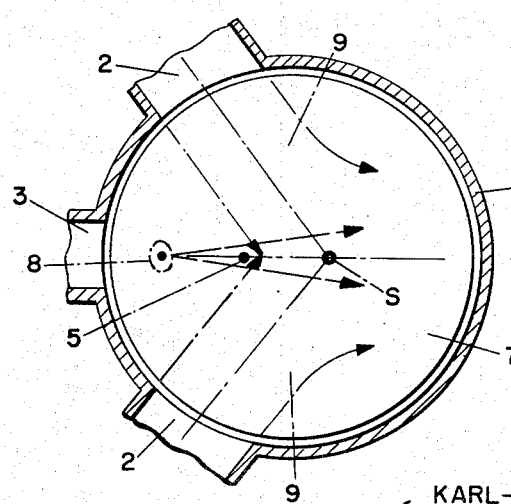
Figure 2 is a cross section of the cylinder taken on line 1—1 of Figure 1.

As illustrated in the drawings, the cylinder wall 1 is provided with two scavenging air ports or passages 2 and an outlet or exhaust port or passage 3. As particularly illustrated in Figure 2, the respective axes of the scavenging ports are at an angle to one another and in general on the same side of the cylinder wall so that the air streams denoted at 9 merge generally at the point S. The cylinder 1 is provided with a dome-shaped combustion chamber 6 at the top thereof and the spark plug 4 is mounted at the top of this dome-shaped combustion chamber. The injection nozzle 8 projects through the cylinder head into the dome-shaped combustion chamber from the side of the cylinder containing the exhaust port 3 and above said port. This injection nozzle has its axis so directed that the fuel jets denoted at 5 meet the rising portions of the scavenging air stream in the neighborhood of the merging point S of these two air streams 9. As is clear from the drawing, since the two air streams 9 have oppositely directed components of motion at the merging point S, there is the area of maximum turbulence. Of course the scavenging air streams are driven upwardly by the up stroke of piston 7 and it is at this merging point S where the turbulence is highest that the fuel mingles with the air streams.

It is of course obvious that this juncture point of the two air streams is not sharply defined. In comparing different constructions of fuel injection combustion engines, the expert in the art has no difficulty in designing components to realize the principle and purposes of the present invention since from the form and direction of the scavenging air conduits one may draw a very accurate conclusion as to the path followed by the scavenging air streams entering the swept out space of the cylinder. The same considerations apply to the disposition of the fuel jets.

It is of course understood that conventional means well known in the art are provided for insuring proper air flow through the scavenging ports. For example, pumps or blowers could be utilized or if desired the invention can be embodied in a two-cycle engine of the crank case compression type.

Having now described my invention, what is desired to be secured by Letters Patent in the United States is:

1. In an internal combustion engine of the fuel injection, spark ignition type, an improvement comprising wall means defining a cylinder having at least two scavenging air ports therein the respective axes of which are directed toward a junction point within the cylinder located at least closely adjacent the cylinder axis so that scavenging air streams entering the cylinder merge adjacent said point, and fuel injection means projecting into the cylinder and having its axis directed downwardly and at an angle to the cylinder axis and toward said point.

2. In an internal combustion engine of the fuel injection, spark ignition type, an improvement comprising wall means defining a cylinder and having at least two scavenging air ports therein the respective axes of which are directed toward a junction point within the cylinder so that scavenging air streams entering the cylinder merge adjacent said point, fuel injection means projecting into the cylinder and having its axis directed toward said point, said cylinder including a dome-shaped combustion chamber, a spark plug at the top of said combustion chamber and the fuel injection means projecting through the top of the combustion chamber and being directed toward the said junction point of the scavenging air streams from a position above and laterally displaced with respect to said point.

3. In an internal combustion engine of the fuel injection, spark ignition type, an improvement comprising wall means defining a cylinder and having at least two scavenging air ports therein the respective axes of which are directed toward a junction point within the cylinder so that scavenging air streams entering the cylinder merge adjacent said point, fuel injection means projecting into the cylinder and having its axis directed toward said point, the wall means having an exhaust port intermediate the scavenging ports and the fuel injection means projecting into the cylinder from the same side of the axis of the cylinder as the location of the exhaust port.

4. In an internal combustion engine of the fuel injection, spark ignition type, an improvement comprising wall means defining a cylinder and having at least two scavenging air ports therein the respective axes of which are directed toward a junction point within the cylinder so that scavenging air streams entering the cylinder merge adjacent said point, fuel injection means projecting into the cylinder and having its axis directed toward said point, said cylinder including a dome-shaped combustion chamber as a continuation thereof, a spark plug in the top of said combustion chamber, said cylinder having an exhaust port intermediate the scavenging ports on the same side of the cylinder axis as said scavenger ports and the fuel injection means projecting through the combustion chamber at a point above and laterally displaced with respect to the axis of the cylinder and overlying the exhaust port so that the fuel jets pass downwardly and outwardly to meet the scavenging air streams at least closely adjacent the junction point of the scavenging air streams.

References Cited in the file of this patent

FOREIGN PATENTS

| Number | Country | Date |
|--------|---------|------|
| 818,526 | France | June 21, 1937 |
| 879,443 | France | Nov. 19, 1942 |